Sept. 1, 1925. Re. 16,153

P. O. VANATTER

RINSE TUB

Original Filed March 10, 1920

INVENTOR.

P. O. Vanatter

BY Harold Elmo Smith

ATTORNEY.

Reissued Sept. 1, 1925.

Re. 16,153

UNITED STATES PATENT OFFICE.

PHARES OBADIAH VANATTER, OF ATHENS, GEORGIA, ASSIGNOR TO WALTER A. FRANTZ, OF CLEVELAND, OHIO.

RINSE TUB.

Original No. 1,357,749, dated November 2, 1920, Serial No. 364,760, filed March 10, 1920. Application for reissue filed September 11, 1922. Serial No. 587,574.

*To all whom it may concern:*

Be it known that I, PHARES OBADIAH VANATTER, a subject of the King of Great Britain, residing at Athens, in the county of Clarke and State of Georgia, have invented a new and improved Rinse Tub, of which the following is a full, clear, and exact description.

This invention relates to improvements in rinse tubs, an object of the invention being to provide a unitary tub of the character stated, which is divided into compartments and which has rotary mounting so that each of the compartments can be brought into convenient operative position by simply turning the tub.

A further object is to provide a tub of the character stated, which is especially adapted for use in connection with an electric washer, and which results in an economy of time and labor in the operation of washing clothing and other articles.

With these and other objects in view, the invention consists in certain novel features of construction and combinations and arrangements of parts as will be more fully hereinafter described and pointed out in the claims.

Figure 1:
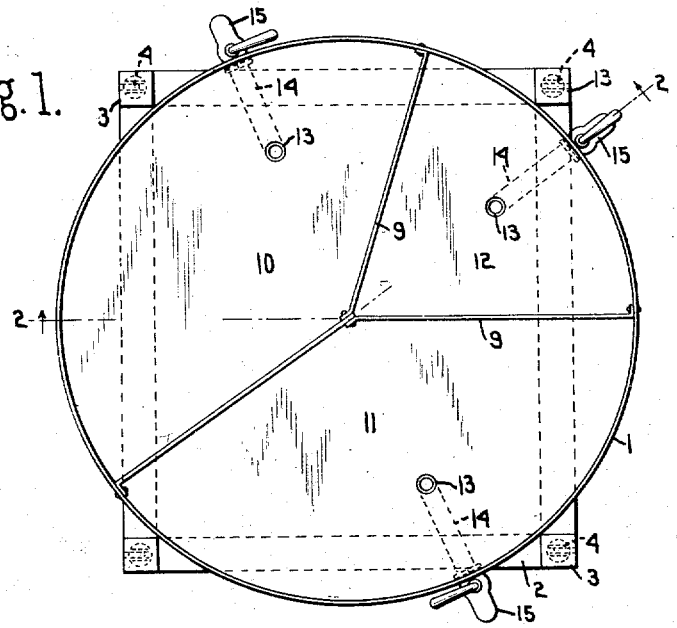
Figure 1 is a top plan view illustrating my improved tub.
Figure 2:
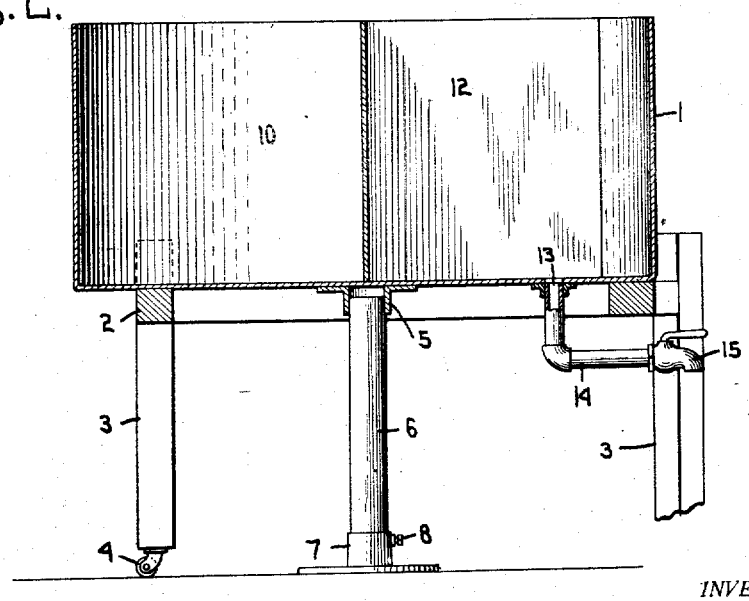
Fig. 2 is a view in vertical section on the line 2—2 of Fig. 1.

1 represents my improved tub which is of cylindrical form, and supported on a frame 2. The frame 2 is provided with legs 3 having casters 4 at their lower ends to run freely on the floor or ground.

On the bottom of the tub and secured centrally thereto, is a bearing sleeve 5, which fits over the upper end of a cylindrical post or pedestal 6, and turns freely thereon. The post 6 is secured in a base cup 7 which latter is provided with a set screw 8 to jam against the post and hold the latter against movement.

The tub 1 is divided by partitions 9 into three compartments 10, 11, and 12, the compartments 10 and 11 being preferably substantially the same size, and the compartment 12 appreciably smaller, although of course I do not limit myself to any particular number, proportion, or size of said compartments.

All of the compartments, 10, 11 and 12 have outlets 13 in the bottom of the tub, and each outlet 13 communicates with a separate outlet pipe 14 projecting radially under the tub, and having at its outer end a drain cock 15, located beyond the vertical wall of the tub.

In operation the compartment 12 contains the starch and bluing water, compartment 10 contains scalding hot water, and compartment 11 contains cold water.

The tub is turned to bring each compartment in turn into convenient position for use in ordinary laundry operation.

The foregoing is a description of the specific embodiment illustrated in my drawing but I do not limit myself to the particular mode of supporting the tub nor the details of design and arrangement since various changes might be made in the general form of the parts described without departing from my invention, and hence I do not limit myself to the precise details set forth, but consider myself at liberty to make such alterations as fairly fall within the spirit and scope of the appended claims.

I claim:

1. The combination with a frame, and casters supporting the frame, of a stationary post independent of the frame and located centrally therein, a tub supported on the frame, and a bearing sleeve on the bottom of the tub having rotary mounting on the post and constituting a guide and coupling means for the turning movement of the tub and frame.

2. A device of the character described comprising a supporting frame and a tub on the frame, said frame being of general rectangular shape, legs at the corners of said frame, casters on said legs, a stationary upright post, a bearing sleeve secured to the bottom of the tub and fitting over the end of said post and guiding the rotary movement of the tub and frame.

3. A device of the character stated, comprising a rectangular frame, legs on the frame, casters on the legs, a stationary cylindrical post, a tub adapted to be positioned on said frame, a bearing sleeve secured to the bottom of the tub and adapted to fit over the end of the post, and said post and bearing sleeve adapted to guide the turning movement of the tub and frame.

4. In a device of the character described, in combination, an upright pedestal securely fixed in position and a tub mounted for rotative movement about the vertical axis of said pedestal, the bottom of said tub having a part which rotatably engages said pedestal, the side wall of said tub defining a surface of revolution about the axis of said pedestal, and the interior of said tub having a plurality of radiating partitions defining independent compartments, there being a closable outlet in the bottom of each compartment.

PHARES OBADIAH VANATTER.